United States Patent [19]
Madonia

[11] 3,738,617
[45] June 12, 1973

[54] DOUGH CONDITIONING APPARATUS

[76] Inventor: Anthony F. Madonia, 19 Middlebury Lane, Buffalo, N.Y. 14216

[22] Filed: Oct. 23, 1970

[21] Appl. No.: 83,339

[52] U.S. Cl. .............................................. 259/185
[51] Int. Cl. ......... A21c 1/00, A23g 1/00, A23g 1/10
[58] Field of Search .................... 259/104, DIG. 3, 259/DIG. 5, DIG. 7, DIG. 8, DIG. 10, DIG. 11, DIG. 12, 185, 186, 9, 10, 40-46, 6

[56] References Cited
UNITED STATES PATENTS

| | | | |
|---|---|---|---|
| 3,185,449 | 5/1965 | Kasten ..................... | 259/6 |
| 3,345,442 | 10/1967 | Oxel ........................ | 259/6 X |
| 947,635 | 1/1910 | Darling ................... | 107/30 X |
| 1,651,092 | 11/1927 | Lauterbur et al ......... | 259/DIG. 12 |
| 1,005,769 | 10/1911 | Chambers ............... | 259/DIG. 8 |
| 833,089 | 10/1906 | Scheuch .................. | 259/DIG. 8 |
| 2,064,758 | 12/1936 | Kirchhoff ................ | 259/DIG. 8 |
| 921,361 | 5/1909 | Chambers ............... | 107/36 |
| 2,274,220 | 2/1942 | Sticelber ................. | 107/30 X |
| 3,218,043 | 11/1965 | Ronk ....................... | 416/65 |

*Primary Examiner*—George V. Larkin
*Attorney*—Christel & Bean

[57] ABSTRACT

A hopper for receiving a dough mixture and gravity feeding the same to a degassing apparatus. A plurality of agitator rods mounted in the hopper stretch and work the dough mixture to dispel some of the gases retained therein and to fragment large, unequal sized, gas pockets and bubbles formed in the mixture into smaller, uniform sized pockets rendering the mixture soft, pliable and of a uniform texture and consistency prior to the admission of the mixture into the degassing apparatus.

6 Claims, 5 Drawing Figures

INVENTOR.
Anthony F. Madonia
BY
Christel & Bean
ATTORNEYS.

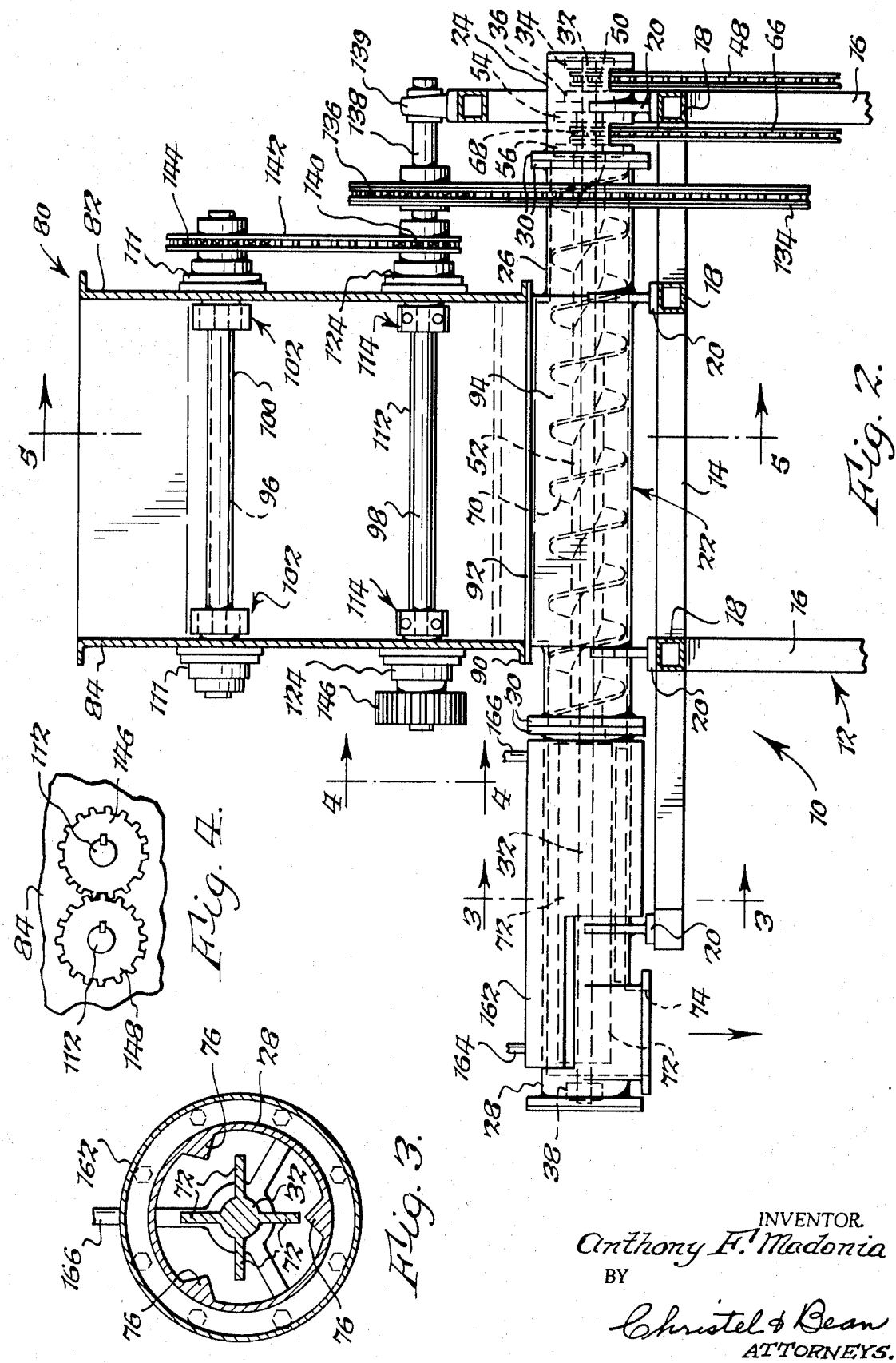

DOUGH CONDITIONING APPARATUS

BACKGROUND OF THE INVENTION

This invention relates to a dough forming apparatus and, more particularly, to apparatus for conditioning dough prior to the degassing operation.

In conventional dough forming operations, an alimentary paste or dough mixture is formed in a mixing chamber by homogeneously admixing the necessary ingredients, such as water, salt, flour and yeast in the quantities desired by the user. The dough mixture is then deposited in a hopper which gravity feeds the mixture to a degassing apparatus for dispelling some of the gases present in the dough mixture. The finished product is then discharged from the degassing apparatus and divided into discrete bodies to form rolls, buns, and the like and ultimately fed into the baking ovens.

While a certain amount of gas retention in the dough mixture is desirable to facilitate raising thereof in the "proofer" in order to obtain a high quality baked product, an excessive amount of gas in the dough mixture detrimentally affects the texture and consistency thereof due to the formation of large, uneven gas pockets therein and results in an inferior finished product. An excessive gas build-up can occur when a batch of dough is allowed to stand idle for a few minutes because it continues to ferment and expand. Likewise, since a major portion of the dough mixture disposed in the hopper of conventional degassing apparatus temporarily remains idle, it also generates these large, uneven gas pocket formations causing the dough to rise upwardly in the hopper. The longer the dough remains idle, the more susceptible it is to the formation of these undesirable gas pockets. Accordingly, the last portion of a given batch of dough entering the degassing chamber varies materially in texture, consistency and density from that portion initially introduced into the degassing chamber. As a result, the degassing process becomes progressively less effective from the beginning of a batch to the end thereof resulting in a nonuniform yield which is coarse and rough finished and which differs significantly in appearance from the smooth, velvety and well developed batch fresh from the mixing chamber. Such a coarse and rough finished yield has poor oven spring and produces baked products that are uneven in size due to poor scaling, spotty and dull in color, have air holes and pockets, crust blisters and are of a coarse grain. Such dough often is unacceptable and must be scrapped.

SUMMARY OF THE INVENTION

Accordingly, it is an object of the present invention to provide the feed hopper leading to the degassing apparatus with a dough conditioning apparatus for maintaining the dough mixture soft, pliable, smooth and uniform in texture.

Another object of this invention is to provide the foregoing apparatus with means for stretching and folding the dough mixture to maintain the same elastic and of uniform consistency.

In one aspect thereof, the dough conditioning apparatus of this invention is characterized by the provision of a plurality of agitator rods rotatable in a feed hopper for maintaining the dough mixture therein pliable, soft, smooth and of uniform texture and consistency. The agitator rods engage the dough mixture to stretch and work the same bursting the large air bubbles to either dispel the gas therefrom or form smaller bubbles of a uniform size.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 2 is a fragmentary vertical sectional view taken about on line 2—2 of FIG. 1;

FIG. 3 is a cross sectional view, on an enlarged scale, taken about on line 3—3 of FIG. 2;

FIG. 4 is a fragmentary rear elevational view, taken about on line 4—4 of FIG. 2 and showing the interengaging gears of the agitator rods.

DETAILED DESCRIPTION OF A PREFERRED EMBODIMENT

Figure 1:
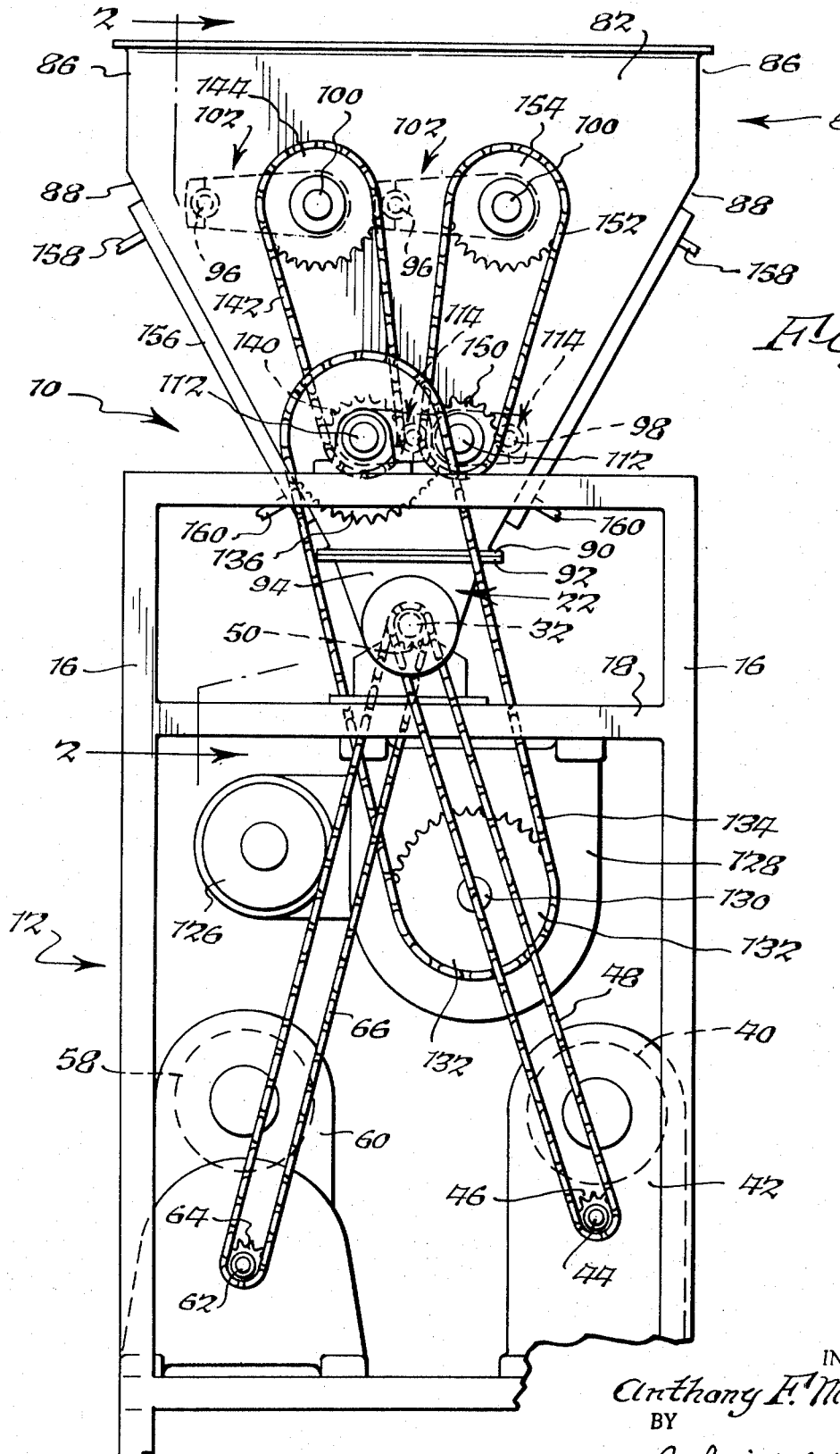
FIG. 1 is a front elevational view of a dough processing apparatus incorporating the dough conditioning mechanism of this invention.

Referring now in detail to the drawings, there is shown in FIGS. 1 and 2 a dough degassing apparatus, generally designated 10, incorporating the dough conditioning apparatus of this invention, and comprising a frame 12 consisting of a plurality of horizontally extending structural members 14 and a plurality of vertically extending structural members 16 welded or otherwise fixedly secured together to form a generally rectangular, box-like framework construction. The lower ends (not shown) of the vertically extending structural members 16 can be suitably supported on a base in the usual manner or on castor assemblies to render the apparatus mobile. A series of laterally spaced cross members 18 extend between structural members 14 to complete the framework construction.

A series of cradle support brackets 20 are mounted on the upper surfaces of cross members 18 for supporting a generally cylindrical casing 22. Casing 22 consists of three sections, namely, a drive section 24, a feed section 26, and a developing or dough kneading and discharge section 28. The adjacent ends of these sections are provided with annular flanges 30 welded or otherwise secured together to form a long, continuous, hollow casing 22.

An elongated, rotatable shaft 32 is mounted in casing 22, extending substantially lengthwise thereof and journalled at one end thereof in spaced bearings 34 and 36 contained within casing section 24. The other end of shaft 32 is journalled in bearings 38 mounted in casing section 28. The means for rotating shaft 32 includes an electric motor 40 mounted on frame 12 and coupled, through a suitable gear reduction mechanism 42, to a drive shaft 44 having a chain drive sprocket 46 rigidly secured thereon. An endless drive chain 48 is trained about drive sprocket 46 and a sprocket 50 mounted on shaft 32 for rotating the same.

A hollow, rotatable shaft 52, surrounding shaft 32 and concentric therewith, is journalled at one end thereof in spaced bearings 54 and 56 contained within casing section 24. The other end of shaft 52, which terminates at the juncture of casing sections 26 and 28, is journalled in a sleeve bearing (not shown) interposed between inner shaft 32 and outer shaft 52. These shafts are independently driven for rotation relative to each other and can be driven at different speeds, as desired. The means for rotating shaft 52 includes an electric motor 58 mounted on frame 12 and coupled, through a suitable gear reduction mechanism 60, to a drive shaft 62 having a drive sprocket 64 rigidly secured thereon. An endless drive chain 66 is trained about drive sprocket 62 and a sprocket 68 secured about shaft 52 for rotating the same.

Mounted about the peripheral surface of shaft 52 for rotation therewith is a helical screw 70 forming with shaft 52 a screw conveyor for feeding and extruding the dough product through casing section 26 and into section 28. A plurality of elongated blades or paddles 72 are rigidly secured to the outer surface of shaft 32 and extend radially outwardly therefrom to knead and stretch the dough mixture in casing section 28 prior to the discharge of the dough through outlet 74. As shown in FIG. 3, a plurality of circumferentially spaced stators 76 in the form of triangular projections extend radially inwardly from the inner surface of casing section 28. Stators 76 are elongated in the direction of the shaft axis, and define with paddles 72 constrictions through which the dough mixture is pressed in order to fully develop the same.

In accordance with this invention, an improved feed hopper, generally designated 80 and having a dough conditioning means therein constructed in accordance with this invention as will be presently described, is provided for receiving the dough mixture from a mixing apparatus, not shown, which thoroughly admixes the necessary ingredients such as water, salt, flour and yeast, in the quantities desired by the user. Hopper 80 has a generally V-shaped configuration in front elevation and comprises a front wall 82, a rear wall 84, and a pair of side walls 86 having inclined portions 88 converging downwardly toward each other. The cross section of hopper 80 progressively decreases in size from the upper ends of inclined portions 88 downwardly toward the outlet end thereof, which is provided with a flange 90 suitably secured to a flange 92 of a trough-like extension 94 extending upwardly from casing section 26. Thus, hopper 80 is rigidly secured to casing section 26 and has a bottom outlet communicating 95 with the interior of section 26.

Figure 5:
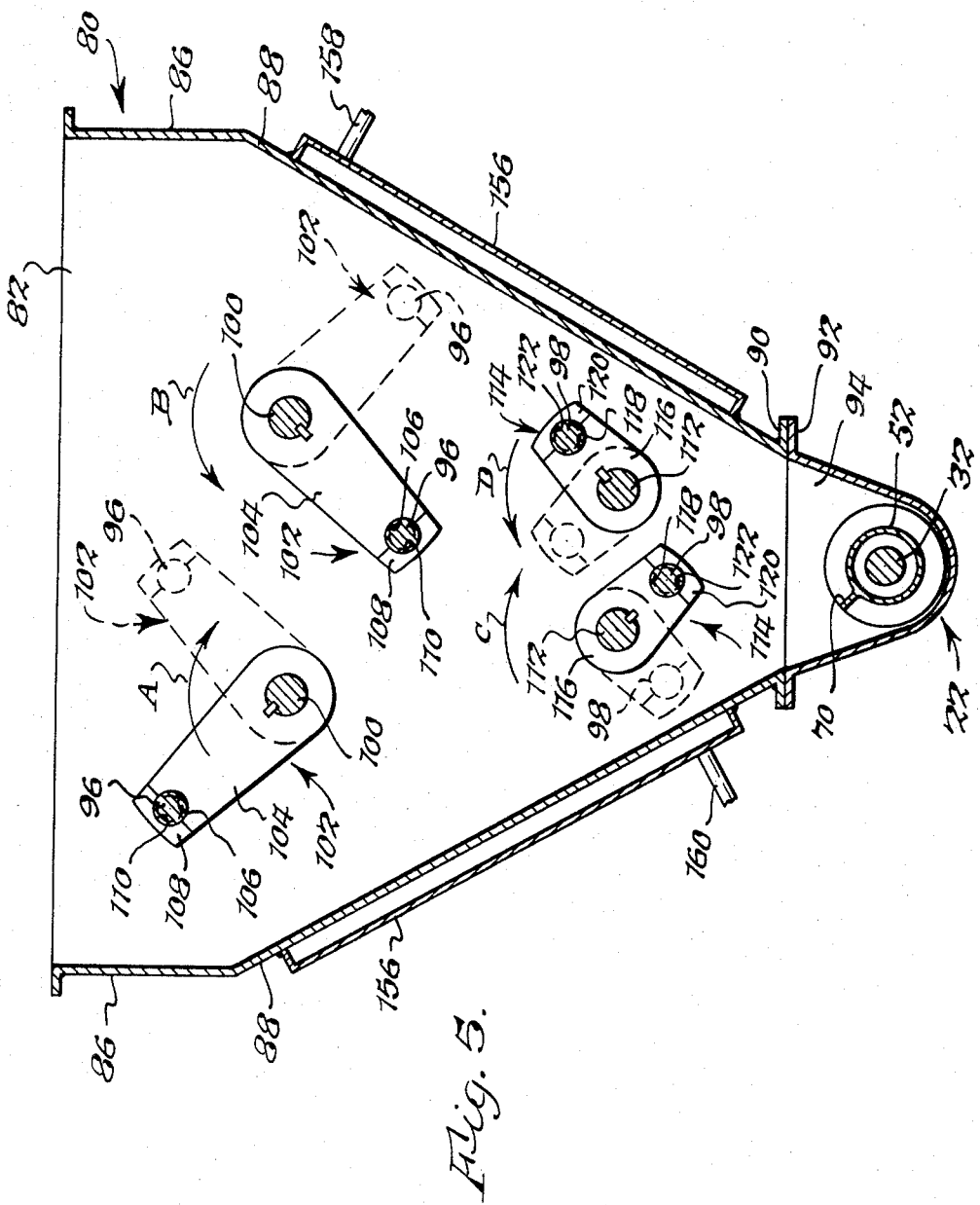
FIG. 5 is a vertical sectional view, on an enlarged scale, taken about on line 5—5 of FIG. 2.

A particular feature of this invention is the provision of means in hopper 80 for conditioning the dough mixture received from the initial blending or mixing apparatus by thoroughly agitating and working such dough mixture to obtain a uniform texture and consistency thereof prior to introducing the same into the degassing stage. Such dough conditioning means comprises an upper pair of laterally spaced agitators or rods 96 (FIG. 5) and a lower pair of laterally spaced agitators or rods 98 mounted in hopper 80. Rods 96 are connected to laterally spaced shafts 100 by means of longitudinally spaced connecting links 102 mounted on the opposite ends of shafts 100. Each connecting link 102 comprises an arm 104 having a semicircular groove 106 at the distal end thereof and an end cap member 108 also having a semi-circular groove 110 for receiving one end of rod 96 therebetween. End cap members 108 can be secured to link arms 104 by any suitable fasteners (not shown). Shafts 100 extend through the front and rear walls 82 and 84 of hopper 80 and are journalled in bearings 111 mounted on the outer surfaces of such walls.

In a similar construction, rods 98 are connected to laterally spaced shafts 112 by means of longitudinally spaced connecting links 114 mounted on the opposite ends of shafts 112. Each connecting link 114 comprises an arm 116 having a semi-circular groove 118 at the distal end thereof and an end cap member 120 also having a semi-circular groove 122 for receiving one end of rod 98 therebetween. Any suitable fastening means (not shown) can be employed to secure end cap member 120 to link arm 116. Shafts 112 extend through the front and rear walls 82 and 84 of hopper 80 and are journalled in bearings 124 mounted on the outer surfaces of these walls.

Means are provided for rotating shafts 100 and 112, such means comprising an electric motor 126 mounted on frame 12 and coupled, by means of a suitable gear reduction mechanism 128, to a drive shaft 130 having a sprocket 132 mounted thereon. An endless drive chain 134 is trained about sprocket 132 and a sprocket 136 mounted on an extension 138 of the left hand shaft 112 as viewed in FIG. 1. Extension 138 is journalled in a suitable bearing 139 mounted on frame 14. A second sprocket 140 is mounted on shaft extension 138 for engaging and driving an endless drive chain 142 entrained about a sprocket 144 secured on the upper left hand shaft 100 as viewed in FIG. 1. Thus, one set of shafts 100 and 112 are simultaneously rotated by means of the sprocket and chain arrangement 140-144. The shafts 100 and 112 can be driven at different speeds or at the same speed as dictated by the diameter ratio of sprockets 140 and 144. Also, if desired, a take-up sprocket (not shown) can be provided in engagement with drive chain 142 for taking up any slack therein.

The end of the lower left hand shaft 112 (FIG. 1) projecting through hopper wall 84 is provided with a gear 146 meshing with a gear 148 (FIG. 4), which is mounted on the end of the other shaft 112, whereby rotary motion of the one shaft 112 is transmitted to the other lower shaft 112. The end of the right hand shaft 112, as viewed in FIG. 1, projecting through hopper wall 82 is provided with a sprocket 150 for engaging and driving an endless chain 152 entrained about a sprocket 154 secured to the upper right hand shaft 100. In this manner, the other set of shafts 100 and 112 is simultaneously rotated via the sprocket and chain arrangement 150-154 in timed, synchronous relation to the first set of shafts.

In operation, the raw materials or dough ingredients are thoroughly mixed in a mixing chamber (not shown) to produce a mass or batch of homogeniously mixed dough, which is deposited in hopper 80. The pair of spaced rods 96 are driven in clockwise and counterclockwise directions, respectively, as indicated by arrows A and B (FIG. 5) in overlapping or intersecting orbital paths. However, rods 96 are relatively positioned in an orientation such that they do not collide during their revolving motion in these orbital paths. Likewise, the pair of spaced rods 98 also are offset relative to each other and driven in intersecting orbital paths indicated by arrows C and D. The engagement of the two sets of rods 96 and 98 with the dough mixture continuously lifts, stretches and folds the dough at a relatively slow rate of speed to maintain the dough soft and elastic and to fragment the larger gas bubbles into smaller bubbles of uniform size, dispelling some of the gasses while retaining the necessary amount of gas in the dough to obtain a high quality product. Thus, the dough entering sections 26 and 28 of the degassing apparatus has a uniform density throughout the entire batch to render it uniformly degassable. As a result, the dough discharged from outlet 74 has a fresh, smooth, attractive appearance similar to the dough freshly discharged from the initial blender or mixer. In the event of stoppage, the idle dough tends to retain its freshness and softness for a much longer period of time thereby avoiding the necessity of scrapping the dough.

The conditioning or working of the dough in hopper 80 is accompanied by the generation of heat which, if not dissipated, adversely affects the quality of the finished product. To this end, water jackets 156 are welded or otherwise fixedly secured to the inclined portions 88 of side walls 86 of hopper 80. As shown in FIG. 1, suitable inlets 158 and outlets 160 are provided for the admission and discharge of water or any other suitable coolant. By circulating a coolant through jackets 156, the temperature of the dough mixture can be controlled to prevent excessive heat build up therein which causes undesirable gas expansion in the dough mixture.

A water jacket 162 also is disposed about section 28 of casing 22 (FIG. 2) for dissipating some of the heat generated in the dough mixture caused by the beating and kneading action of paddles 72. A suitable inlet 164 and outlet 166 are provided for the admission and discharge of the coolant which circulates in jacket 162 about casing section 28.

From the foregoing, it is apparent that the objects of the present invention have been fully accomplished. As a result of this invention, a dough conditioning apparatus is incorporated in a feed hopper for continually stretching and working the dough delivered therein to obtain a soft, elastic dough product of uniform consistency and texture having small, uniform sized bubbles or pockets for the retention of the necessary amount of gases in the dough product. By maintaining the dough product uniform throughout an entire batch prior to introducing the same into the degassing stage of the apparatus, the latter is effective to yield a high quality, finished dough product maintaining the desirable properties of a freshly mixed batch of dough. Moreover, temporary stoppage or breakdown in the degassing stage will not destroy the usefulness of the dough since it retains its freshness for a substantial period of time. Also, the finished dough has excellent flow characteristics enabling it to fill the forms in the baking pans and rise more uniformly in the proofer or raising machine. Rolls made from dough processed through the conditioner of this invention are bold and full bodied, are uniform in grain and texture, and have improved flavor and color and a longer shelf life.

A preferred embodiment of this invention having been disclosed in detail, it is to be understood that this has been done by way of illustration only.

I claim:

1. Apparatus for conditioning a thoroughly mixed and fully developed dough mixture comprising: a hopper for receiving a thoroughly mixed and fully developed dough mixture; said hopper having an inlet and an outlet; at least one pair of laterally spaced drive shafts rotatably mounted in said hopper; said shafts being interposed between said inlet and said outlet and rotatable about axes extending transversely through said hopper; a pair of elongated agitator rods in said hopper between said inlet and outlet and extending thereacross in parallelism with said axes of said drive shafts; a pair of longitudinally spaced links connecting the opposite ends of said drive shafts to the opposite ends of said rods; respectively; and means for rotating said shafts in opposite directions to revolve said rods in opposite directions in orbital paths within said hopper to continually stretch and fold said dough mixture.

2. Apparatus as set forth in claim 1 wherein said orbital paths intersect and said rods are angularly offset from each other to avoid collision therebetween.

3. Apparatus as set forth in claim 1 including a second pair of laterally spaced drive shafts rotatably mounted in said hopper below said one pair of drive shafts, a second pair of elongated agitator rods in said hopper extending generally parallel to said second pair of drive shafts, means connecting said second pair of drive shafts to said second pair of agitator rods, respectively, in spaced relation thereto, and means for rotating said second pair of drive shafts in opposite directions to revolve said rods in orbital paths below said first pair of revolving rods.

4. Apparatus as set forth in claim 3 wherein said rotating means include drive means operably connecting said first pair and said second pair of drive shafts together.

5. A dough processing system comprising: a degassing apparatus having a conveyor feed section and a dough kneading section connected thereto, a hopper for receiving a thoroughly mixed and fully developed dough mixture, said hopper having an outlet in communication with the conveyor feed section of said degassing apparatus, and means mounted in said hopper for agitating said dough mixture to preclude excessive gas retention therein prior to the admission of said mixture into said conveyor feed section, said agitating means comprising a pair of laterally spaced drive shafts, a pair of agitator rods extending parallel to said drive shafts, a pair of longitudinally spaced links connecting the opposite ends of said drive shafts to the opposite ends of said rods, respectively, in spaced relation thereto, and means for rotating said drive shafts in opposite directions whereby said rods are revolved in intersecting orbital paths, said rods being angularly offset from each other to preclude collision therebetween.

6. The combination of claim 5 including a second pair of laterally spaced drive shafts below said first pair of drive shafts, a second pair of agitator rods connected to said second pair of drive shafts in spaced relation thereto, and drive means coupled to said rotating means for rotating said second pair of drive shafts in opposite directions.

* * * * *